United States Patent [19]

Colson et al.

[11] Patent Number: 4,967,824
[45] Date of Patent: Nov. 6, 1990

[54] CORD EQUALIZER

[75] Inventors: Wendell B. Colson, Boulder; Terry Akins, Louisville, both of Colo.

[73] Assignee: Hunter Douglas, Inc.

[21] Appl. No.: 366,994

[22] Filed: Jun. 16, 1989

[51] Int. Cl.⁵ .............................................. E06B 9/38
[52] U.S. Cl. ................................ 160/178.1; 24/136 R
[58] Field of Search .................... 160/178.1, 168.1; 24/136 R, 115 M, 114.5

[56] References Cited

U.S. PATENT DOCUMENTS

| | | | |
|---|---|---|---|
| 2,220,203 | 11/1940 | Branin | 24/136 R |
| 2,529,327 | 11/1950 | Carlson | 24/136 R X |
| 4,665,590 | 5/1987 | Udelhofen et al. | 24/136 R X |
| 4,788,755 | 12/1988 | Kasai | 24/136 R |

Primary Examiner—Blair M. Johnson
Attorney, Agent, or Firm—Pennie & Edmonds

[57] ABSTRACT

An improved equalizer for gripping two or more cords of a shade is described. The equalizer of the invention comprises a molded body member having a tapered inner channel into which a molded insert member fits. The cords are placed within the channel through a gap formed in one wall of the body member, and are clamped against a rear wall thereof by the insert member. As the insert member is inserted more fully into the body member, the cords are compressed between the insert and the rear surface of the body member, and the insert is permanently wedged into the body member.

17 Claims, 1 Drawing Sheet

CORD EQUALIZER

FIELD OF THE INVENTION

This invention relates to an improved cord equalizer. More particularly, this invention relates to an improved equalizer for firmly gripping two or more control cords of a window shade.

BACKGROUND OF THE INVENTION

Cord equalizers are conventionally used in window shades and blinds of all kinds. A cord equalizer for a shade has several functions which provide constraints on its design. The cord equalizer is used to grip two or more shade control cords, to allow their convenient operation as one, to keep the shade level when it is pulled to the headrail from which it is normally suspended and to keep the cord from tangling. The cord equalizer is also used to provide a stop for the cord as the shade is lowered to the bottom of its travel; that is, the cord equalizer abuts the cord locking mechanism provided in the headrail to prevent further lowering of the shade.

Various known types of cord equalizers suffer from various combinations of defects. Some known cord equalizers have been extremely complicated and difficult to install. For example, equalizers with closed housings require threading of the cords through the housing. Others grip the cords in such a way as to damage it, leading to premature failure. Other types of cord equalizers are difficult to adjust in order to provide equal pull on the cords, e.g., those to which the cords are fixed by separately tied knots. Other cord equalizers tend to fail prematurely due to wear. Improvement in cord equalizers is therefore needed.

SUMMARY OF THE INVENTION

The present invention satisfies the needs of the art mentioned above by provision of an improved cord equalizer which allows easy insertion of the cords and which locks the cords in place by compressing them against a flat surface, thus not over-stressing the cords or urging them against a sharp edge or the like. The members of the equalizer are not subject to wear.

More specifically, the cord equalizer of the invention comprises a first molded body member and a second insert member. The insert is locked against the body member on the wedge principle. A wedge-shaped channel extends through the body member, growing generally narrower from an entrance to an exit. The cords are disposed in the channel, behind the insert. As the insert is pushed into the cavity, it is urged against the cords, compressing them against the body member. As one pulls downwardly on the equalizer, that is, exerting tension on the cords to control the shade, the insert is drawn more tightly into the body member. On the other hand, the insert can be removed from the body member simply by pulling the cords in the opposite direction. This allows the cord equalizer to be readily adjusted.

The body member comprises a U-shaped channel wherein flanges are formed on the legs of the U, extending toward one another. A space is left between the flanges through which the cords can be easily placed in the interior of the body member. The side walls of the channel are tapered from an entrance end of the channel to an exit end, providing wedging surfaces. The insert fits beneath the flanges, and is of hat-shaped cross-section, having a center section extending outwardly between the flanges, thus providing convenient alignment and a neat appearance. Projections from the center section are retained beneath the flanges of the body member. When the assembly is complete, the center section is flush with the outer surface of the body member, and the ends of the insert are flush with those of the body member.

BRIEF DESCRIPTION OF THE DRAWINGS

The invention will be better understood if reference is made to the accompanying drawings, in which.

DESCRIPTION OF THE PREFERRED EMBODIMENT

Figure 1:
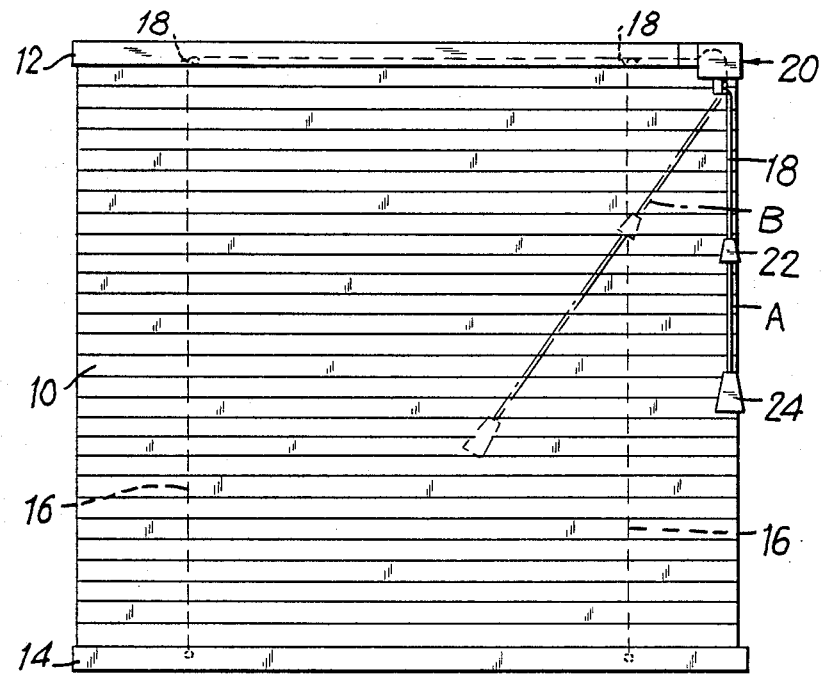
FIG. 1 shows a front view of a typical shade employing the equalizer according to the invention.

FIG. 1 shows a front view of a conventional shade or blind member incorporating the equalizer of the invention. The shade comprises an expandable and collapsible shade or blind member 10 formed according to any one of a number of teachings, suspended from a headrail 12 and optionally having a foot rail 14 at its lower extremity. Two or more cords 16 (in some cases up to eight parallel cords) pass upwardly from the foot of the shade member or from the foot rail 14 up into the headrail 12, and thence by guides 18 toward a locking mechanism 20 at one end of the headrail. The cords are moved from a locked position A in which they hang when released to a released position B in order to control the cords. The user may grasp the cords 18 directly, grasp a tassel 24 typically affixed to the ends of the cords, or grasp an intermediate equalizer 22 according to the invention.

In the preferred embodiment, the locking mechanism 20 is "crash-proof", meaning that if the cords are released the locking mechanism 20 will engage the cords 18 and prevent the shade member 10 from crashing to its lowest extent. The travel of the shade member 10 is limited by the relative position of the equalizer 22 on the cords 18, which abuts the locking mechanism 20 at the full travel of the shade member. The equalizer must therefore be firmly affixed to the cords such that it does not weaken them, and such that it is not separated from the cords when it abuts the locking mechanism 20.

The equalizer comprises a first molded body member 30 and a second molded insert member 32. The equalizer 22 is shown fully assembled in FIGS. 2 and 4 and at an intermediate stage of its assembly in FIG. 3. As indicated, the body member 30 is generally tapered, and defines a U-shaped channel with flanges 30d extending toward one another from the legs of the U, partially closing the channel. The channel is thus defined by first and second side walls 30a and 30b, a third rear wall 30c, and a partial fourth wall which comprises first and second flanges 30d which approach each other from the outer ends of the side walls 30a and 30b.

Figure 2:
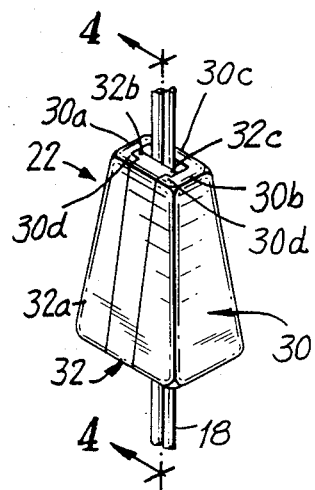
FIG. 2 shows a perspective view of the equalizer of the invention, in a fully assembled configuration.
Figure 3:
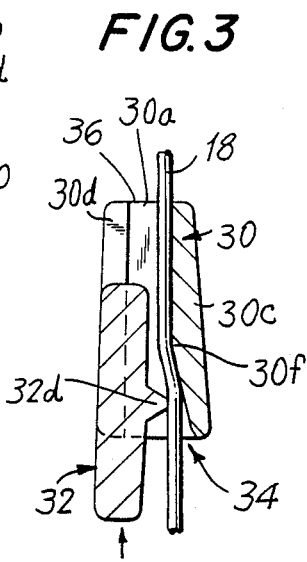
FIG. 3 shows a cross-sectional view through the equalizer of the invention, showing the insert member being inserted into the body member.
Figure 4:
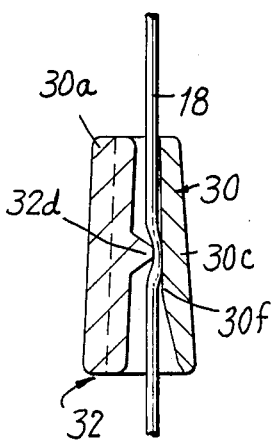
FIG. 4 shows a view corresponding to FIG. 3 with the insert fully inserted into the body member, and is equivalent of a view taken on the line 4—4 of FIG. 2.

The insert 32 comprises an elongated member which is generally of hat-shaped cross section, having a central portion 32a and first and second projections 32b and 32c. As can be seen in FIG. 2, when the insert 32 is fully inserted into the body member 30, the center section 32a is flush with the outer surface of the fourth wall of the body member 30, thus providing a neat appearance. The projections 32b and 32c fit beneath the flanges 30d. As shown by FIGS. 3 and 4, the insert 32 also comprises a transverse ridge 32d.

FIGS. 3 and 4 show that the first and second walls 30a and 30b of the body member 30 become more narrow from the entrance end 34 of the body member to the exit end 36, so that the inside surface of the third wall 30c is farther from the inner surface of the flanges 30d at the entrance end 34 of the channel than at the exit end 36. In particular, the rear wall 30c may be formed to have a gentle bend 30f therein as shown. The cords 18 are disposed between the insert and the rear wall 30c of the body. Thus, when the insert 32 is inserted from the entrance end and moved axially toward the exit end, the insert 32 compresses the cords 18 against the rear wall 30c of the body member 30. In particular, the ridge 32d urges the cords 18 against the inner surface of rear wall 30c of the body member 30. As shown in FIG. 4, the ridge 32d eventually tightly compresses the cords 18 against the rear wall 30c, firmly gripping them and securing the equalizer 22 in place on the cords 18.

The bend 30f in the inner surface of the rear wall 30c effectively defines the point at which the ridge 32d first urges the cords firmly against the rear wall 30c. Bend 30f separates the inner surface of the rear wall 30c into two sections, a first section which is inclined with respect to the inner surfaces of the flanges 30d, and a second section which is parallel thereto. When the insert 32 is fully inserted into the channel, the ridge 32d is juxtaposed to the second parallel section of the inner surface of the rear wall. Provision of bend 30f limits the axial distance through which the insert member 32 must be moved with the cords tightly compressed. This expedient controls the force required to move the insert 32 with respect to the body member 30 to reach the position of FIG. 4.

It will be appreciated that the shape of the insert is chosen with respect to the spacing of the inner surfaces of the flanges from the inner surface of the third rear wall such that the insert eventually reaches the final position shown in FIGS. 2 and 4, in which the ridge 32d confines the cords against the inner surface of the rear wall 30c.

Friction between the insert 32, the cords 18 and the body 30 is normally sufficient to retain the equalizer on the cords, particularly when (as is normal) the equalizer is installed with the entry end down. In this position, the user tends to tighten the grip of the equalizer on the cords by exerting tension on them by grasping the equalizer to control the motion of the shade. However, at any time, the equalizer can be freed from the cords by pulling the equalizer upwardly with respect to the cords. This frees the insert 32 from the body 30.

In the embodiment shown, the rear and partial fourth walls of the body member have parallel sides, that is, the tapered first and second walls 32a and 32b are parallel to one another, but this need not necessarily be the case. Making the entry end of the channel somewhat wider than the exit end eases insertion of the insert. The insert may also be tapered, and the third and fourth walls parallel.

The materials of the body member and insert are normally identical so that they can be formed in a single molding step. The members should be formed of some readily molded, inexpensive, friction and heat resistant plastic material. Other details of the manufacture of the equalizer of the invention are considered to be within the skill of the art.

While a preferred embodiment of the invention has been disclosed in detail, this is not to be considered as a limitation thereon but only as exemplary thereof. The invention should therefore not be limited by the above disclosure, but only by the following claims.

We claim:

1. In combination, a window covering cord equalizer for gripping two or more cords and a shade, said shade comprising a headrail, an expandable and collapsible shade member, and two or more control cords extending from the foot of said shade member up toward, into, and out of said headrail, said equalizer engaging said cords, wherein said equalizer comprises:

a body member, defining an elongated channel of generally U-shaped cross-sectional shape and having an entry-end and an exit-end, said channel having opposed first and second walls forming the legs of the U interconnected by a third wall forming the web of the U, flanges on the outer ends of said opposed first and second walls extending towards one another but spaced apart from one another to form a partial fourth wall having a gap therein open over the entire length of said channel leaving a free space between said flanges, the third and/or the partial fourth wall being shaped so as to reduce the spacing between the third wall and the fourth wall starting at or near the entry-end and extending in the direction of the exit-end, over at least a portion of the channel length; and an elongated insert for being received in and slidable into said channel from the entry-end, said insert having projections formed along opposite longitudinal sides of a central section, said projections fitting behind said flanges at the inside of the body member;

the channel and the insert being shaped with respect to one another so that upon moving the insert into and along the channel, the insert will reach a final position in which the distance between the portion of the insert most closely juxtaposed to the interior surface of the third wall and said interior surface of the third wall is less than a minimum distance.

2. The combination of claim 1, wherein a cord-engaging ridge for compressing two or more cords between the insert and the third wall is formed on the surface of said insert juxtaposed to the interior surface of the third wall, said ridge extending transverse to the direction of insertion of said insert into the channel.

3. The combination of claim 1, wherein the inner surface of the third wall is closer to the inner surfaces of the partial fourth wall at the exit-end of the channel than at the entry-end of said channel.

4. The combination of claim 1, wherein the reduction of the spacing between the third and fourth wall takes place only over part of the channel length, whereby a bend is formed in the inner surface of the third wall.

5. The combination of claim 1, wherein the central portion of the insert is shaped to slidably fit between the flanges extending from the first and second walls and forming the partial fourth wall, and wherein the projections on said insert are shaped to slidably fit between the first and second walls.

6. The combination of claim 1 wherein said central section of said insert in at least its final position is substantially flush with the outer surfaces of said partial fourth wall.

7. The combination of claim 1, wherein the inner surfaces of said first and second walls are parallel to one another.

8. The combination of claim 7, wherein said insert is generally rectangular, and its width across said projections is essentially equal to the spacing of said first and second walls.

9. In combination, a cord equalizer for gripping two or more cords of a shade, and a shade, said shade comprising a headrail, an expandable and collapsible shade member, and two or more control cords extending from the foot of said shade member up toward, into, and out of said headrail, said equalizer engaging said cords, wherein said equalizer comprises:
 a molded body member, generally defining an elongated channel of U-shaped cross-section, said channel having three complete walls and exit and entry ends, and flanges on the outer ends of opposed first and second walls forming the legs of the U extending toward one another to define a partial fourth wall, the inner surface of the third wall being closer to the inner surface of the partial fourth wall at the exit end of the channel than at the entry end of said channel; and
 an elongated insert for being received at the entry end of and sliding into said channel, said insert being of hat-shaped cross-section, wherein opposed projections formed on either side of a central portion of said insert extend in the direction of elongation of said insert, said central section fitting between said flanges and said projections being retained beneath said flanges,
 whereby as said insert is moved axially along said channel from the entry end to the exit end thereof, said insert is urged against the third wall of said channel by said partial fourth wall.

10. The combination of claim 9, wherein a cord-engaging ridge is formed extending transversely across said insert, for being urged against said third wall of said body member as said insert is moved axially into said body member.

11. The combination of claim 10, wherein said third wall is formed to define a bend meeting said ridge of said insert at a particular point in the motion of said insert within said channel.

12. The cord equalizer of claim 9, wherein said central portion of said insert is substantially flush with the outer surfaces of said partial fourth wall when said insert is fully inserted into said body member.

13. The combination of claim 9, wherein said insert is generally rectangular, and its width across said projections is essentially equal to the spacing of said first and second walls.

14. In combination, a cord equalizer for gripping two or more cords, and a shade, said shade comprising a headrail, an expandable and collapsible shade member, and two or more control cords extending from the foot of said shade member up toward, into, and out of said headrail, said equalizer engaging said cords, wherein said equalizer comprises:
 a molded channel member having open ends, first and second side walls, a third back wall joining said first and second side walls, and a partial fourth wall consisting of opposed flanges having a gap therebetween extending toward one another from the first and second side walls, and
 a molded elongated insert member sized to be received in said channel and retained beneath said flanges;
 wherein the shape of the inner surfaces of said flanges of said fourth wall and their spacing from the inner surface of said third wall is chosen with respect to the cross-sectional shape of said insert member such that as the insert member is inserted into the channel it becomes wedged between said third and fourth walls.

15. The combination of claim 14 wherein the spacing of the inner surfaces of the flanges from the inner surface of said third wall is greater at an entry end of said channel than at an exit end of said channel.

16. The combination of claim 15 wherein the inner surface of the third wall comprises a transverse bend, whereby a first portion of the inner surface of the third wall extending into the channel from the entry end is inclined with respect to the inner surfaces of the flanges and the remaining second portion of the inner surface of the third wall is substantially parallel to the inner surface of the flanges.

17. The combination of claim 16 wherein said insert member has a ridge formed in its surface which is juxtaposed to the inner surface of said third wall, such that when said insert is inserted fully into said channel, said ridge is opposed to said second portion of said inner surface of the third wall.

* * * * *

UNITED STATES PATENT AND TRADEMARK OFFICE
CERTIFICATE OF CORRECTION

PATENT NO. : 4,967,824

DATED : November 6, 1990

INVENTOR(S) : Colson et al.

It is certified that error appears in the above-identified patent and that said Letters Patent is hereby corrected as shown below:

Column 5, line 48, "cord equalizer" should read
--combination--.

Signed and Sealed this

Seventeenth Day of March, 1992

Attest:

HARRY F. MANBECK, JR.

*Attesting Officer*      *Commissioner of Patents and Trademarks*